(12) United States Patent
Nakayasu

(10) Patent No.: US 6,515,979 B1
(45) Date of Patent: Feb. 4, 2003

(54) BASEBAND SIGNAL PROCESSOR CAPABLE OF DEALING WITH MULTIRATE AND MULTIUSER COMMUNICATION WITH A SMALL STRUCTURE

(75) Inventor: Kanada Nakayasu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/327,535

(22) Filed: Jun. 8, 1999

(30) Foreign Application Priority Data

Jun. 9, 1998 (JP) .......................................... 10-161057

(51) Int. Cl.[7] .......................... H04B 7/216; H04B 15/00
(52) U.S. Cl. ....................... 370/342; 370/335; 370/328; 375/144; 375/148
(58) Field of Search ............................... 370/320, 328, 370/335, 342, 465, 441, 479, 347, 337; 375/144, 148, 150, 147, 343, 130, 347, 344, 345; 455/127, 69, 70, 132, 133, 134

(56) References Cited

U.S. PATENT DOCUMENTS

| | | | | |
|---|---|---|---|---|
| 5,818,883 A | * | 10/1998 | Smith et al. ................. | 375/347 |
| 5,872,776 A | * | 2/1999 | Yang .......................... | 370/342 |
| 6,078,576 A | * | 6/2000 | Schilling et al. ............. | 370/335 |
| 6,366,606 B1 | * | 4/2002 | Sriram ....................... | 375/147 |
| 6,377,785 B1 | * | 4/2002 | Ogino ........................ | 455/127 |

FOREIGN PATENT DOCUMENTS

| | | |
|---|---|---|
| JP | 62-45237 | 2/1987 |
| JP | 63-283246 | 11/1988 |
| JP | 6-125329 | 5/1994 |
| JP | 7-99487 | 4/1995 |
| JP | 7-231278 | 8/1995 |
| JP | 8-56384 | 2/1996 |
| JP | 8-508152 | 8/1996 |
| JP | 9-501547 | 2/1997 |
| JP | 9-247045 | 9/1997 |
| JP | 9-321667 | 12/1997 |
| JP | 10-94041 | 4/1998 |
| JP | 10-98448 | 4/1998 |
| JP | 10-117157 | 5/1998 |
| JP | 10-336072 | 12/1998 |

* cited by examiner

Primary Examiner—Nguyen T. Vo
Assistant Examiner—John J Lee
(74) Attorney, Agent, or Firm—Sughrue Mion, PLLC

(57) ABSTRACT

A baseband signal processor is used in a base station of a CDMA communication system. The baseband signal processor comprised a plurality of processing panels which abstract specific data sequences from an input signal to produce abstracted data sequences. A RAKE section is connected to the processing panels which synthesize the abstracted data sequences to produce the synthesized data sequence. A controller is related to the processing panels and connected to the RAKE section to select at least one of the processing panels in response to a first transmission rate. Selected processing panels selected by the controller abstract the first derivative data sequences from the input signal as the specific data sequences and to produce first abstracted data sequences as the abstracted data sequences. The RAKE section synthesizes the first abstracted data sequences under the control of the controller.

10 Claims, 2 Drawing Sheets

BASEBAND SIGNAL PROCESSOR CAPABLE OF DEALING WITH MULTIRATE AND MULTIUSER COMMUNICATION WITH A SMALL STRUCTURE

BACKGROUND OF THE INVENTION

This invention relates to a baseband signal processor for used in a base station of a CDMA communication system, particularly, relates to a baseband signal processor capable of dealing with multirate and multiuser communication.

A well known mobile communication system includes base stations and mobile terminals. Each of the base stations covers a cell and communicates with the mobile terminals located in the cell.

With recent rapid increase of the number of the mobile terminals (or subscribers), usable frequency resources for the mobile communication system are rapidly decreasing. A CDMA (Code Division Multiple Access) communication system is therefore noted because it is higher than all other known communication systems in the frequency utilization efficiency.

By the way, data communication, such as visual data transmission, enjoys an increasing demand in field of mobile communication. The CDMA communication system must therefore deal with not only multiuser communication but also multirate communication from call of a low transmission rate to visual data transmission of a high transmission rate.

A conventional baseband signal processor (or RAKE receiver) is provided in the base station of the CDMA communication system. The baseband signal processor has a plurality of panels to process an input signal which includes a plurality of diffused signals. The number of the panels is equal to the maximum number of mobile terminals that can communicate with the base station through message channels. Each of the panels is formed so as to be possible to process the input signal at the maximum transmission rate for the CDMA communication system and forms a block which is the minimum unit for processing the diffused signals transmitted from one of the mobile terminals.

This type of the RAKE receiver is also used in the mobile terminal. Such RAKE receivers are disclosed in Unexamined Japanese Patent Publication No. Tokkaihei 10-94041, No. Tokkaihei 10-98448, and No. Tokkaihei 10-117157.

As mentioned above, all of the panels can deal with the maximum transmission rate. This is surfeit of equipment provided in the base station as a matter of fact. That is, the conventional baseband signal processor is larger than it needs in size and is expensive.

On the other hand, it is desirable that a cell covered by the base station is smaller, because necessary output power of the base station may be smaller and the frequency resources can be more efficiently used. However, it is necessary to increase the number of base stations in a service area of the CDMA communication system if cells become small. This brings an increase of investment in plant and equipment and an increase of the cost of maintenance for the CDMA system. These expenses are shifted onto the subscribers.

SUMMARY OF THE INVENTION

It is therefore an object of this invention to provide a baseband signal processor capable of dealing with multirate and multiuser communication with smaller structure than it needs.

Other object of this invention will become clear as the description proceeds.

On describing the gist of this invention, it is possible to understand that a baseband signal processor is used in a base station of a CDMA communication system. The baseband signal processor processes an input signal including a plurality of first diffused signals. The first diffused signals are originated from a first original diffused signal which is transmitted from a first mobile terminal at a first transmission rate.

According to the gist of this invention, the baseband signal processor comprises a plurality of processing panels to abstract specific data sequences from the input signal. A RAKE section is connected to the processing panels and is synthesize the abstracted data sequences to produce the synthesized data sequence. A controller is related to the processing panels and connected to the RAKE section. The controller selects at least one of the processing panels in response to the first transmission rate to abstract the first derivative data sequences as the specific data sequences and to produce first abstracted data sequences as the abstracted data sequences. The controller make the RAKE section produce a first synthesized data sequence as the synthesized data sequence.

According to another gist of this invention, the input signal includes a plurality of second derivative data sequences originated from a second original data sequence included in a second transmission signal transmitted from a second mobile terminal at a second transmission rate. The controller selects other one or more of the processing panels in response to the second transmission rate to abstract the second derivative data sequences as the specific data sequences and to produce second abstracted data sequences as the abstracted data sequences. The controller making the RAKE section produce a second synthesized data sequence which is time-divisionally multiplexed with the first synthesized data sequence.

BRIEF DESCRIPTION OF THE DRAWING

FIG. 1 shows a structure of a transmission signal transmitted by a mobile terminal; and.

DESCRIPTION OF THE PREFERRED EMBODIMENT

Figure 1:
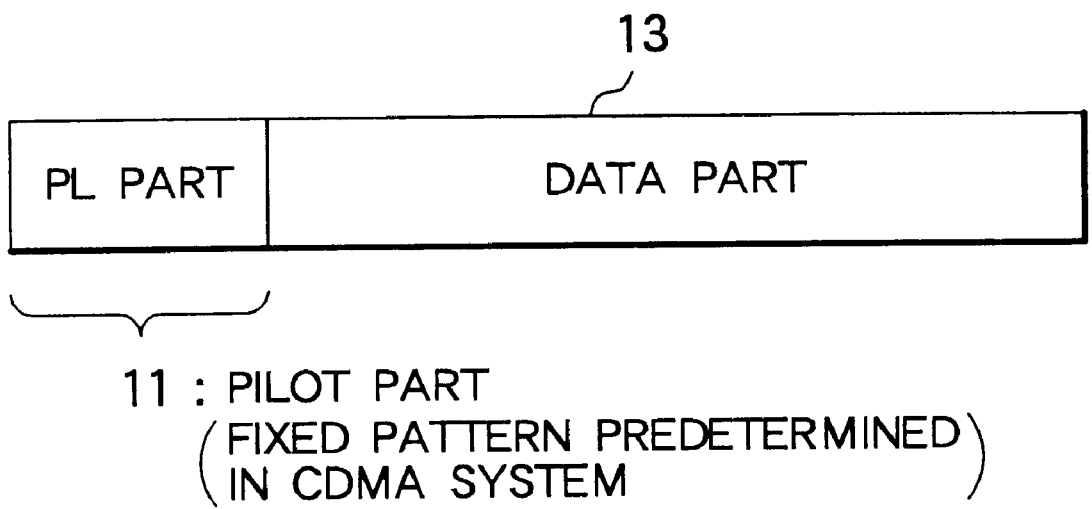
Figure 2:
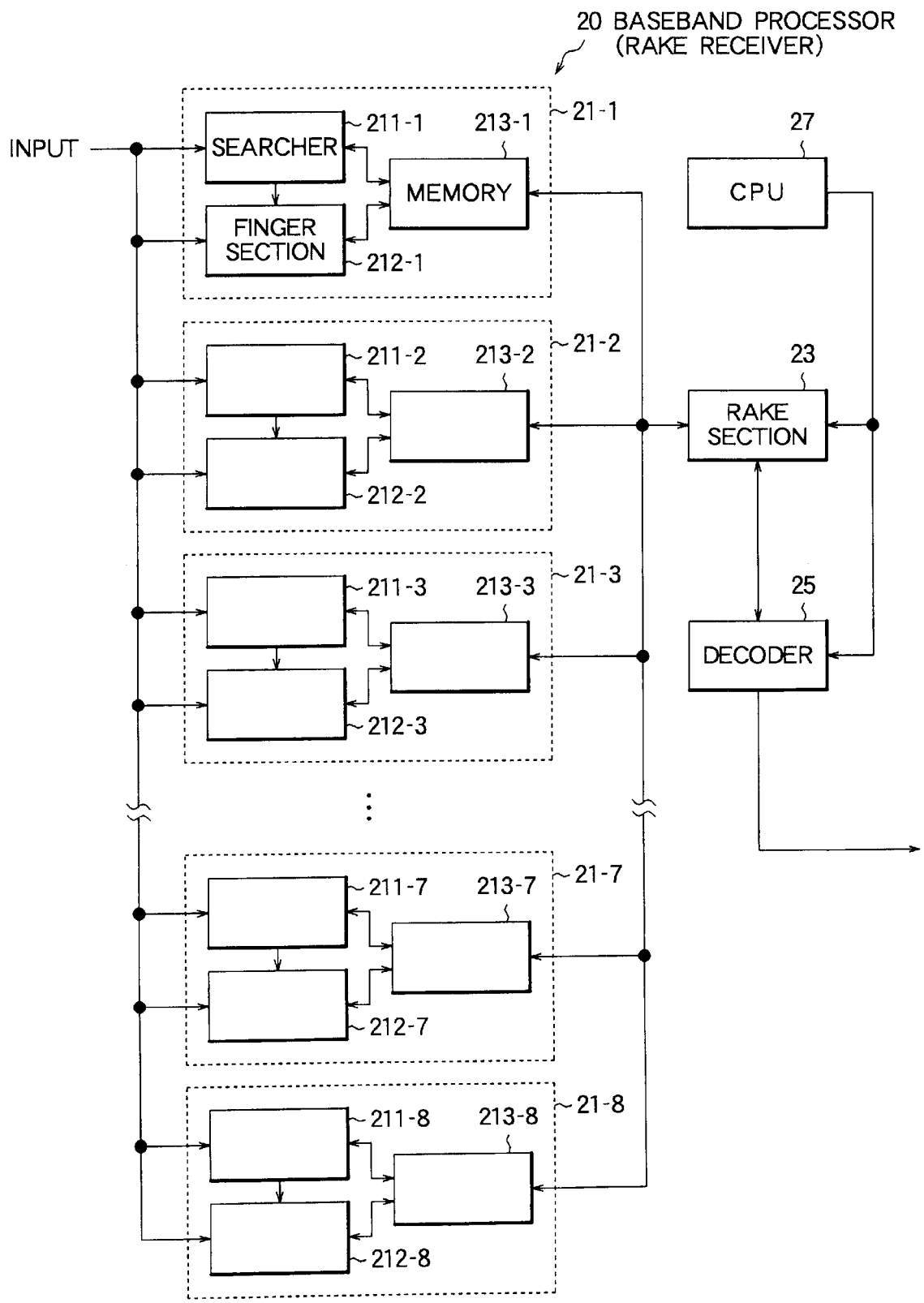
FIG. 2 is a block diagram of a baseband signal processor according to a preferred embodiment of this invention.

Referring to FIGS. 1 and 2, description will be directed to a baseband signal processor according to a preferred embodiment of this invention.

The baseband signal processor is used in a base station of a CDMA radio communication system. The base station has an antenna to receive a radio signal and to produce an analog reception signal. The analog reception signal is converted into a digital reception signal in the base station. The digital reception signal is supplied to the baseband processor as an input signal (or a baseband signal).

In the CDMA radio communication system, mobile terminals or stations use the same frequencies for carrier waves. Each of the mobile terminals modulates the carrier wave with an original data sequence to produce an original transmission signal. Each mobile terminal diffuses the original transmission signal with transmitting diffusion code given by CPU (refer to FIG. 2) of the base station to produce an original diffused signal. The original diffused signal is transmitted to the base station.

The original diffused signal reaches the base station through a plurality of paths different from one another. In other words, a plurality of derivative diffused signals, which is originated from the original diffused signals, is received by the antenna as the radio signal. The radio signal, therefore, includes the derivative diffused signals originated frog the original diffused signal, accordingly the input signal includes derivative data sequences which are originated from the original data sequence which are multiplexed one another.

As shown in FIG. 1, the original data sequence has a pilot (PL) part 11 at its head. The pilot part 11 includes a pilot signal which is predetermined in the CDMA radio communication system. A data part 13 follows the pilot part 11. The data part 13 includes a subscriber's data sequence which is encoded by error detecting and correcting coding, such as adding CRC (cyclic redundancy check) code or convolutional encoding.

In FIG. 2, the baseband signal processor 20 comprises eight processing panels 21-1 through 21-8 supplied with the input signal, an RAKE section 23 connected to the processing panels 21-1 through 21-8, a decoder 25 connected to the RAKE section 23, and a central processing unit (CPU) 27 connected to the RAKE section 23 and the decoder 25.

Each of the processing panels 21-1 through 21-8 has a searcher 211-N (N=1, 2, 3, ..., 7, 8), a finger section 212-N, and a memory 213-N connected to both the searcher 211-N and the finger section 212-N. The processing panels 21-1 through 21-8 individually operate under control of the CPU 27.

When each of the processing panels 21-1 through 21-8 receives parameters supplied from the CPU 40 through the RAKE section 23, it operates as mentioned below. The parameters include a receiving diffusion code, a searcher range of the searcher 211-N, a coefficient for finding of receiving timing, the number of objects (or paths) for RAKE synthesize, etc. The receiving diffusion code is equal to the transmitting diffusion code given to a certain mobile terminal for a message channel connected between the mobile terminal and the base station.

The searcher 211-N diffuses the pilot signal with the receiving diffusion code to produce a searching signal. The searcher 211-N finds correlation coefficient representative of correlation between the input signal and the searching signal and estimates the reception timing of the derivative diffused signals originated from one of the original diffused signals. The correlation coefficient is informed to the finger section 212-N. The correlation coefficient decides operation timing of the finger section 212-N. Reception timing information representative of the reception timing is memorized in the memory 213-N.

The finger section 212-N selects some of the derivative diffused data sequences from the input signal in response to the correlation coefficient. Selected derivative diffused data sequences are originated from one of the original data sequence, because the correlation coefficient is found by the basis of the receiving diffusion code. The CPU 40 as described below decides the number of the selected derivative diffused data sequences. The number is eight at a maximum. The finger section 212-N detects delay time and detection timing of the selected derivative diffused data sequences and stores the memory 213-N with delay time information representative of the delay time and with multipath detection timing information representative of the detection timing. Moreover, the finger section 212-N carries out inverse diffusion of the selected derivative diffused data sequences with the receiving diffusion code. In other words, the finger section 212-N multiplies each of the selected derivative diffused data sequences by the receiving diffusion code. That is, the finger section 212-N abstracts received data sequences, which are correspondent with the selected derivative diffused data sequences, from the input signal. The finger section 212-N stores the memory 215-N with the received data sequences.

The searcher 211-N and the finger section 212-N are (or the processing panel 21 is) optimized so as to process the input signal at a fixed operation rate, for example, of 32 ksps (kilo symbols per second). Hereinafter, description will be made about the baseband processor on the assumption that the fixed operation is 32 ksps. If the original transmission signal is transmitted from the certain base station at a symbol rate of 32 ksps, the finger section 212-N can abstract eight of the derivative data sequences at a maximum.

The memory 213-N is a dual port RAM (Random Access Memory) which is read/written by the searcher 211-N, the finger section 212-N, and the RAKE section 23. The memory 213-N memorized the parameters to supply them to the searcher 211-N and the finger section 212-N. That is, the parameters supplied from the CPU 40 to the searcher 211-N and the finger section 212-N through the RAKE section 23 and the memory 213-N. Moreover, the memory 213-N memorizes the reception timing information, the delay time information, the multipath detection timing information, and the received data sequences as mentioned above.

The RAKE section 23 synthesizes the received data sequences read out form the memory 231-N to produce a synthesized reception data sequence. This synthesizing is carried out on the basis of the delay time information memorized in the memory 213-N under control of the CPU 27. In a case where the CPU 27 supplies the same receiving diffusion code to some of the processing panels 21-1 through 21-8, the RAKE section 23 synthesizes the received data sequences supplied from their processing panels. The RAKE section operates at considerably higher rate than that of the processing panels 21-1 through 21-8.

The decoder 25 decodes the synthesized reception data sequence to produce a decoded reception data sequence. In this time, the decoder 25 detects errors and corrects them. The error detection and correction is, for example, made with CRC check. The decoder 25 supplies the decoded reception data sequence to a control station (not shown) through a wire system, for example, an ISDN (integrated services digital network) or an ATM (asynchronous transfer mode) network. The control station is connected to a public network through a mobile/public network interconnector.

The CPU 27 controls the processing panels 21-1 through 21-8, the R section 23, and the decoder 25 so that they operate as mentioned above.

In addition, the CPU 27 controls connections between the base station and the mobile terminals. When the CPU 27 receives a connection request from a certain mobile terminal through a control channel, it assigns a transmitting diffusion code to the mobile terminal. On the other hand, the CPU 27 selectively supplies receiving diffusion code equal to the transmitting diffusion code to the processing panels 21-1 through 21-8 in response to the connection request.

For example, the connection request requests a transmission rate of 32 ksps, the CPU 27 supplies the receiving diffusion code to one of the processing panels 21-1 through 21-8. The processing panel, which receives the receiving diffusion code, selects eight derivative diffused sequences to process them in response to the number of paths included in the parameters. If the connection request requests a transmission rate of 64 ksps, the CPU 27 supplies the receiving diffusion code to two of the processing panels 21-1 through 21-8. Each of the processing panels, which receive the receiving diffusion code, selects four derivative diffused data sequences to process them. The two processing panels operate as one block. If the connection request requests a transmission rate of 94 ksps, the CPU 27 supplies the receiving diffusion code to three of the processing panels 21-1 through 21-8. Each of the processing panels, which receive the receiving diffusion code, selects two derivative diffused data sequences to process them. The three panels operate as one block. When the connection request requests a transmission rate of 128 ksps, the CPU 27 supplies the receiving diffusion code to four of the processing panels 21-1 through 21-8. Each of the processing panels, which receive the receiving diffusion code, selects two derivative diffused data sequences to process them. The four processing panels operate as one block. Thus the baseband signal processor can deal with from two users of 128 ksps to eight users of 32 ksps.

The operation of the baseband signal processor is described in more detail in the following.

At first, it is assumed that a first user transmits a coded voice signal of 8.8 kbps at a symbol rate of 32 ksps. In this case, the CPU 27 selects one from unused processing panels. It is assumed that the CPU 27 selects the processing panel 21-1.

Then the CPU 27 supplies the parameters, which include the receiving diffusion code and an user ID code assigned to the first user, to the RAKE section 23 and orders the RAKE section 23 to make the processing panel 21-1 process the input signal. The RAKE section 23 stores the memory 213-1 with the parameters.

The searcher 211-1 and the finger section 212-1 operate as mentioned above by the use of the parameters. That is, the searcher 211-1 and the finger section 212-1 produce first reception timing information, first multipath detection timing information, first delay time information, and first received data sequences and stores the memory 213-1 with them. The number of the first received sequences is eight in maximum. Each of the searcher 211-1 and the finger section 212-1 notifies the RAKE section 23 of finish of the writing to the memory.

When the RAKE section receives the notification of the writing finish from both the searcher 211-1 and the finger section 212-1, it reads out the first received data sequences, the first reception timing information, the first multipath detection information, and the first delay time information from the memory 213-1 to synthesize the first received data sequences on the basis of the first reception timing information, the first multipath detection information, and the first delay time information. The RAKE section supplies first synthesized reception data sequence to the decoder 25.

The decoder 25 decodes the first synthesized reception data sequence, detects errors, and corrects the errors to supply first decoded reception data sequence to the control station.

Next, it is assumed that a second user transmits a coded voice signal of 14.8 kbps or a data signal of 32 kbps at a symbol rate of 64 ksps. In this case, the CPU 27 selects two from unused processing panels. It is assumed that the CPU 27 selects the processing panels 21-1 and 21-2.

Then the CPU 27 supplies the parameters, which include the receiving diffusion code and an user ID code assigned to the second user, to the RAKE section 23 and orders the RAKE section 23 to make the processing panels 21-1 and 21-2 process the input signal. The RAKE section 23 stores both the memory 213-1 and 213-2 with the parameters.

The processing panel 21-1 abstracts four received data sequences as a first group of second received data sequences from the input signal in maximum and memorizes them in the memory 213-1. Similarly, The processing panel 21-2 abstracts other four received data sequences as a second group of the second received data sequences from the input signal in maximum and memorizes them in the memory 213-2.

When the processing panels 21-1 and 21-2 inform the RAKE section 23 of writing finish, the RAKE section 23 reads out the first and the second groups of the second received data sequences and other information from the memory 213-1 and 213-2 and synthesizes all of the second received data sequences (eight sets in maximum) to produce second synthesized reception data sequence.

The decoder 25 receives the second synthesized reception data sequences from the RAKE section 23 and decodes the second synthesized reception data sequences to supply second decoded reception data sequence to the control station.

Thirdly, it is assumed that three message channels are assigned to third, fourth, and fifth users (or mobile terminals) one after another.

When the third user transmits coded voice signals of 8.8 ksps at a symbol rate of 32 ksps, the CPU 27 selects one from unused processing panels. It is assumed that the CPU 27 selects the processing panel 21-1.

The processing panel 21-1 abstracts eight received data sequences related to the third user as third received data sequences from the input signal in maximum and memorized them in the memory 213-1. The processing panel 21-1 successively performs the operation mentioned above until the message channel between the third user and the base station is cleared.

Whenever the processing panel 21-1 informs the RAKE section 23 of writing finish, the RAKE section 23 reads out the third reception data sequences from the memory 213-1 and synthesizes the third reception data sequences (eight sets in maximum) to produce third synthesized reception data sequence.

The decoder 25 receives the third synthesized reception data sequences from the RAKE section 23 and decodes the third synthesized reception data sequence to supply third decoded reception data sequence to the control station.

When a fourth user transmits data signals of 64 kbps at a symbol rate of 128 ksps, the CPU 27 selects four from unused processing panels. It is assumed that the CPU 27 selects the processing panels 21-2 through 21-5. In this event, the panel 21-1 goes on processing the input signal for the first user.

Each of the processing panels 21-2 through 21-5 abstracts two received data sequences related to the fourth user. That is, the processing panel 21-2 abstracts two reception data sequences and memorize them in the memory 213-2 as a first group of fourth reception data sequences. The processing panel 21-3 abstracts other two reception data sequences and memorize them in the memory 213-3 as a second group of the fourth reception data sequences. The processing panel 21-4 abstracts still other two reception data sequences and memorize them in the memory 213-4 as a third group of the fourth reception data sequences. The processing panel 21-5 abstracts further still other two reception data sequence and memorize them in the memory 213-5 as a fourth group of the fourth reception data sequences. The processing panels 21-2 through 21-5 successively perform the operation mentioned above until the message channels between the fourth user and the base station is cleared.

Whenever the processing panels 21-2 through 21-5 inform the RAKE section 23 of writing finish, the RAKE section 23 reads out all of the fourth reception data sequences from the memory 213-2 through 213-5. Then, the RAKE section 23 synthesizes the fourth reception data sequences (eight sets in maximum) to produce a fourth synthesized reception data sequence. The RAKE section 23 time-dividionally processes a series of third reception data sequences and a series of fourth reception data sequences.

The decoder 25 receives the third synthesized reception data sequences and the fourth synthesized reception data sequences from the RAKE section 23 and decodes them to supply the decoded reception data sequence that the third decoded reception data sequences are multiplexed with fourth decoded reception data sequences corresponding to the fourth synthesized reception data sequences to the control station.

When a fifth user transmits data signals of 32 kbps at a symbol rate of 64 ksps, the CPU 27 selects two from unused processing panels. It is assumed that the CPU 27 selects the processing panels 21-6 through 21-7. In this event, the processing panel 21-1 goes on processing the input signal for the first user and the processing panels 21-2 through 21-5 go on processing the input signal for the second user.

Each of the processing panels 21-6 and 21-7 abstracts four received data sequences related to the fifth user. That is, the processing panel 21-6 abstracts four received data sequences and memorize them in the memory 213-6 as a first group of fifth received data sequences. The processing panel 21-7 abstracts other two reception data sequences and memorize them in the memory 213-7 as a second group of the fifth reception data sequences. The processing panels 21-6 and 21-7 successively perform the operation mentioned above until the message channel between the fifth user and the base station is cleared.

Whenever, the processing panels 21-6 and 21-7 inform the RAKE section 23 of writing finish, the RAKE section 23 reads out the fifth reception data sequences from the memory 213-6 and 213-7. Then, the RAKE section 23 synthesizes the fifth reception data sequences (eight sets in maximum) to produce a fifth synthesized reception data. The RAKE section 23 time-divisionally processes the series of third reception data sequences and the series of fourth reception data sequences, and a series of fourth reception data sequences.

The decoder 25 receives the third synthesized reception data sequences, the fourth synthesized reception data sequences, and the fifth synthesized reception data sequences from the RAKE section 23 and decodes them to supply the decode reception data sequence that the third decoded reception data sequences is multiplexed with the fourth reception data sequences and the fifth reception data sequences corresponding to the fifth synthesized reception data sequences to the control station.

Because the baseband signal processor adaptively uses the processing panels 21-1 through 21-8 on the basis of the transmission rate of each of the original transmission signals as mentioned above, it can deal with the original transmission signals with smaller structure (or hardware) than it needs in size. The baseband signal processor is more inexpensive than the conventional baseband processor.

Moreover, because the baseband signal processor has the dual port RAMs in the processing panels, exchange of parameters, received data sequences, and so on is effectively performed between the processing panels and the RAKE section. This bring that shortening of processing time.

While this invention has thus for been described in conjunction with the preferred embodiment thereof, it will readily be possible for those skilled in the art to put this invention into practice in various other manners. For example, the number of the processing panels may be sixteen. In this case, the baseband signal processor can deal with sixteen users of a rate of 32 ksps or four users of a rate of 128 ksps in maximum. Moreover, the processing panels 21-1 through 21-8 may be optimized so as to process the input signal at an operation rate of 64 ksps. In this case, the baseband signal processor can deal with eight users of a rate of 64 ksps, sixteen users of a rate of 32 ksps, or two users of a rate of 256 ksps in maximum.

What is claimed is:

1. A baseband signal processor used in a base station of a CDMA communication system for producing a synthesized reception data sequence from an input signal, the input signal including first derivative data sequences originated from a first original data sequence included in a first transmitting signal transmitted from first mobile terminal at a first transmission rate, said baseband signal processor comprising:

a plurality of processing panels for abstracting specific data sequences from the input signal to produce abstracted data sequences, a RAKE section connected to said processing panels for synthesizing said abstracted data sequences to produce the synthesized data sequence, and a controller related to said processing panels and connected to said RAKE section for selecting at least one of said processing panels in response to the first transmission rate to abstract the first derivative data sequences as the specific data sequences and to produce first abstracted data sequences as the abstracted data sequences, said controller making said RAKE section produce a first synthesized data sequence as the synthesized data sequence.

2. A baseband signal processor as claimed in claim 1, each of said processing panels having a finger section and optimized so as to abstract the specific data sequences from the input signal at a fixed operating rate, wherein said controller decides the number of the specific data sequences for said finger section on the basis of the fixed operating rate and the first transmission rate.

3. A baseband signal processor as claimed in claim 2, the finger section has the maximum number for abstracting the specific data sequences, wherein said controller decrease the number of the specific data sequences for the finger section from the maximum number when the first transmission rate is larger than the fixed operating rate.

4. A baseband signal processor as claimed in claim 2, wherein each of said processing panels has a searcher section for providing said finger section with operation timing.

5. A baseband signal processor as claimed in claim 4, wherein said searcher section detects a pilot part from each of the first derivative data sequences to determine the operation timing.

6. A baseband signal processor as claimed in claim 4, wherein each of said processing panels has a memory connected to said searcher section, said finger section, and said RAKE section for memorizing timing information representative of said operation timing and at least one of the abstracted data sequences to provide them to said RAKE section.

7. A baseband signal processor as claimed in claim 6, wherein said memory is a dual port memory.

8. A baseband signal processor as claimed in claim 1, the input signal including a plurality of second derivative data sequences originated from a second original data sequence included in a second transmission signal transmitted from a second mobile terminal at a second transmission rate, wherein said controller selects other one or more of said processing panels in response to the second transmission rate to abstract the second derivative data sequences as the specific data sequences and to produce second abstracted data sequences as the abstracted data sequences, said controller making said RAKE section produce a second synthesized data sequence which is time-divisionally multiplexed with the first synthesized data sequence.

9. A method of processing an input signal in a base station of a CDMA communication system, the input signal including a plurality of first derivative data sequences originated from a first original data sequence included in a first transmission signal transmitted by a first mobile terminal at a first transmission rate, said method comprising the steps of;

selecting first panels from processing panels in response to the first transmission rate, making the first panels abstract the first derivative data sequences to produce first abstracted data sequences, and synthesizing the first abstracted data sequences to produce a first synthesized data sequence.

10. A method as claimed in claim 9, the input signal further including a plurality of second derivative data sequences originated from a second original data sequence included in a second transmission signal transmitted by a second mobile terminal at a second transmission rate, wherein selecting second panels from the processing panels in response to the second transmission rate, making second panels abstract the second derivative data sequences to produce second abstracted data sequences, and synthesizing the second abstracted data sequences to produce a second synthesized data sequence which is time-divisionally multiplexed with the first synthesized data sequence.

\* \* \* \* \*